(12) United States Patent
Nakayama et al.

(10) Patent No.: US 9,991,495 B2
(45) Date of Patent: Jun. 5, 2018

(54) WIRING MODULE

(71) Applicants: AUTONETWORKS TECHNOLOGIES, LTD., Yokkaichi, Mie (JP); SUMITOMO WIRING SYSTEMS, LTD., Yokkaichi, Mie (JP); SUMITOMO ELECTRIC INDUSTRIES, LTD., Osaka-shi, Osaka (JP)

(72) Inventors: Osamu Nakayama, Yokkaichi (JP); Mitsutoshi Morita, Yokkaichi (JP)

(73) Assignees: SUMITOMO WIRING SYSTEMS, LTD., Mie (JP); SUMITOMO ELECTRIC INDUSTRIES, LTD., Osaka (JP); AUTONETWORKS TECHNOLOGIES, LTD., Mie (JP)

( * ) Notice: Subject to any disclaimer, the term of this patent is extended or adjusted under 35 U.S.C. 154(b) by 418 days.

(21) Appl. No.: 14/405,914

(22) PCT Filed: May 31, 2013

(86) PCT No.: PCT/JP2013/065199
§ 371 (c)(1),
(2) Date: Dec. 5, 2014

(87) PCT Pub. No.: WO2013/183559
PCT Pub. Date: Dec. 12, 2013

(65) Prior Publication Data
US 2015/0287969 A1   Oct. 8, 2015

(30) Foreign Application Priority Data

Jun. 7, 2012   (JP) ................................. 2012-129803

(51) Int. Cl.
*H01M 2/20*   (2006.01)

(52) U.S. Cl.
CPC ........ *H01M 2/206* (2013.01); *H01M 2220/20* (2013.01)

(58) Field of Classification Search
CPC .......................... H01M 2220/20; H01M 2/206
See application file for complete search history.

(56) References Cited

U.S. PATENT DOCUMENTS

| 3,956,576 A | 5/1976 | Jensen et al. |
| 6,090,502 A | 7/2000 | Ingram et al. |

(Continued)

FOREIGN PATENT DOCUMENTS

| EP | 0 765 005 A2 | 3/1997 |
| EP | 2 713 422 A1 | 4/2014 |

(Continued)

OTHER PUBLICATIONS

Feb. 12, 2016 Office Action issued in European Patent Application No. 13 801 099.6.

(Continued)

*Primary Examiner* — Lingwen R Zeng
(74) *Attorney, Agent, or Firm* — Oliff PLC

(57) ABSTRACT

Adjacent coupling units of a plurality of coupling units are slidably coupled via connecting members in a connection direction of the connecting members. Of the plurality of coupling units, one coupling unit of adjacent coupling units that are not coupled to each other via the corresponding connecting member includes an extension portion that is extended toward another connecting member that is different from the connecting member that couples the one coupling unit. The extension portion holds the other connecting member.

7 Claims, 7 Drawing Sheets

(56) References Cited

U.S. PATENT DOCUMENTS

| | | | |
|---|---|---|---|
| 6,261,719 B1 | 7/2001 | Ikeda et al. | |
| 2011/0104556 A1* | 5/2011 | Kim | H01M 2/1077 |
| | | | 429/160 |
| 2012/0295485 A1* | 11/2012 | Ikeda | H01M 2/206 |
| | | | 439/626 |
| 2013/0010449 A1 | 1/2013 | Ikeda et al. | |
| 2013/0071721 A1 | 3/2013 | Ogasawara et al. | |

FOREIGN PATENT DOCUMENTS

| | | |
|---|---|---|
| EP | 2 731 173 A1 | 5/2014 |
| EP | 2 733 773 A1 | 5/2014 |
| JP | A-2000-149909 | 5/2000 |
| JP | A-2005-353547 | 12/2005 |
| JP | A-2011-238544 | 11/2011 |
| JP | A-2012-059451 | 3/2012 |
| JP | A-2012-084319 | 4/2012 |
| JP | A-2012-138333 | 7/2012 |
| JP | A-2013-017332 | 1/2013 |

OTHER PUBLICATIONS

Apr. 24, 2015 Extended European Search Report issued in European Application No. 13801099.6.

\* cited by examiner

WIRING MODULE

TECHNICAL FIELD

The present invention relates to a wiring module.

BACKGROUND

Battery modules for electric cars and hybrid cars include a flat main portion that includes a power generating element thereinside and a plurality of electric cells including positive and negative electrode terminals—that are stacked upon one another. Also, the electrode terminals of adjacent electric cells are connected to each other by connecting members (bus bars), and thereby, the plurality of electric cells are connected in series or parallel.

Here, in the configuration of JP 2000-149909A described below, a battery connection plate is provided in which a plurality of bus bars are incorporated to a substrate portion made of synthetic resin by insert molding. By mounting this battery connection plate to a plurality of batteries, the plurality of bus bars are connected together.

With this configuration of JP 2000-149909A, the substrate portion is provided with a pitch adjustment means in order to prevent a mounting failure of the battery connection plate (wiring module) caused by a dimensional error in the pitch between the electrodes.

SUMMARY

Technical Problem

A dimensional error occurring in a battery module is not limited to the pitch between electrodes that are connected by bus bars (connecting members). For example, in the case of assembling a wiring module to a portion of electric cells other than the electrodes, there is also concern that a mounting failure of the wiring module may be caused not only by a dimensional error in the inter-electrode pitch, but also by a dimensional error between the wiring module and the portion of the electric cells that is other than the electrodes.

It is an object of the exemplary embodiments to provide a wiring module capable of preventing a failure during its mounting to a plurality of electric cells.

Solution to Problem

An exemplary embodiment is directed to a wiring module including connecting members for connecting, in a battery module in which a plurality of electric cells including positive and negative electrode terminals are lined up, the electrode terminals of the adjacent electric cells to each other, and a resin protector holding the connecting members, wherein: the connecting members include first connecting members that connect the electrode terminals of the adjacent electric cells to each other, and second connecting members that connect the electrode terminals of the adjacent electric cells to each other in a direction intersecting a connection direction of the first connecting members; the resin protector includes a plurality of coupling units that are coupled via the connecting members; the adjacent coupling units of the plurality of coupling units are slidably coupled via the connecting members in a connection direction of said connecting members; of the plurality of coupling units, one coupling unit of adjacent coupling units that are not coupled to each other via the corresponding connecting member includes an extension portion that is extended toward another connecting member that is different from the connecting member that couples the one coupling unit; and the extension portion holds the other connecting member.

With this configuration, the adjacent coupling units are coupled via the corresponding connecting member so that each is slidable in the connection direction of the connecting member. Accordingly, it is possible to mount the wiring module to the plurality of electric cells by this slidable movement, while changing the relative positional relationship between the coupling units in the connection direction of the connecting members according to the error in dimensional accuracy. Thus, it is possible to prevent a failure during mounting of the wiring module.

In this regard, when the connection directions of the first connecting members and the second connecting members are in an intersecting relationship, the relative positional relationship between adjacent coupling units that are not coupled via the connecting members of the plurality of coupling unit tends to change. Consequently, there is the possibility that the ease of arrangement of the plurality of coupling units may be decreased and the workability during mounting of the wiring module may be reduced.

On the other hand, with the present configuration of the plurality of coupling units, one coupling unit of adjacent coupling units that are not coupled to each other via the corresponding connecting member includes an extension portion that is extended toward another connecting member that is different from the connecting member that couples the one coupling unit, and the extension portion holds the other connecting member. This increases the ease of arrangement during attachment of the wiring module, thus making it possible to improve workability during attachment of the wiring module.

It is preferable to include the following configurations as exemplary embodiments of the above-described configuration.

The extension portion includes a pair of holding walls that are disposed along side edges of the other connecting member and that holds the other connecting member thereinside, and a dimension between the pair of holding walls is set to form a predetermined clearance between the other connecting member and the pair of holding walls when the other connecting member is held inside the pair of holding walls.

This makes it possible to cause positional displacement between the other connecting member and the extension portion within a range corresponding to the predetermined clearance, and it is thus possible to prevent a failure during mounting of the wiring module according to the dimensional difference.

The extension portion includes a bottom plate on which the connecting member is placed, and the pair of holding walls standing upright from side edges of the bottom plate.

This can simplify the configuration of the extension portion.

The extension portion is provided to the one of the plurality of coupling units coupled via the plurality of connecting members that is disposed at an end of the coupling.

This makes it possible to increase the ease of arrangement during attachment of the wiring module for the coupling unit disposed at an end of the coupling that tends to cause a decrease in the ease of arrangement of the plurality of coupling units.

One coupling unit of the adjacent coupling units is provided with a fitted portion, and the other coupling unit that is different from the one coupling unit is provided with a fitting portion for fitting in the fitted portion.

This makes it possible to increase the ease of arrangement in the wiring module, while permitting relative movement between the coupling units according to the clearance between the holding walls.

The coupling units are provided with positioning portions for positioning relative to the electric cells.

This makes it possible to position the coupling units by the positioning portion. Thus, during this positioning, it is possible to move the coupling units relative to each other according to the dimensional difference between the electric cells and the coupling units.

The wiring module is fixed to the electric cells by inserting electrode terminals having a rod shape or shaft portions of bolts into through holes of the connecting members, and the through holes have an oval shape that is elongated in the connection direction of the connecting members.

Since the through holes of the connecting members have an oval shape that is elongated in the connection direction of the connecting members, it is possible to insert the electrode terminals having a rod shape or the shaft portions of the bolts into the through holes of the connecting members even if there is a dimensional difference between the electrode terminals in the connection direction of the connecting members.

Advantageous Effects

It is possible to prevent a failure during mounting of a wiring module to a plurality of electric cells.

DETAILED DESCRIPTION OF THE EMBODIMENTS

Hereinafter, an exemplary embodiment will be described with reference to FIGS. 1 to 8.

Figure 1:
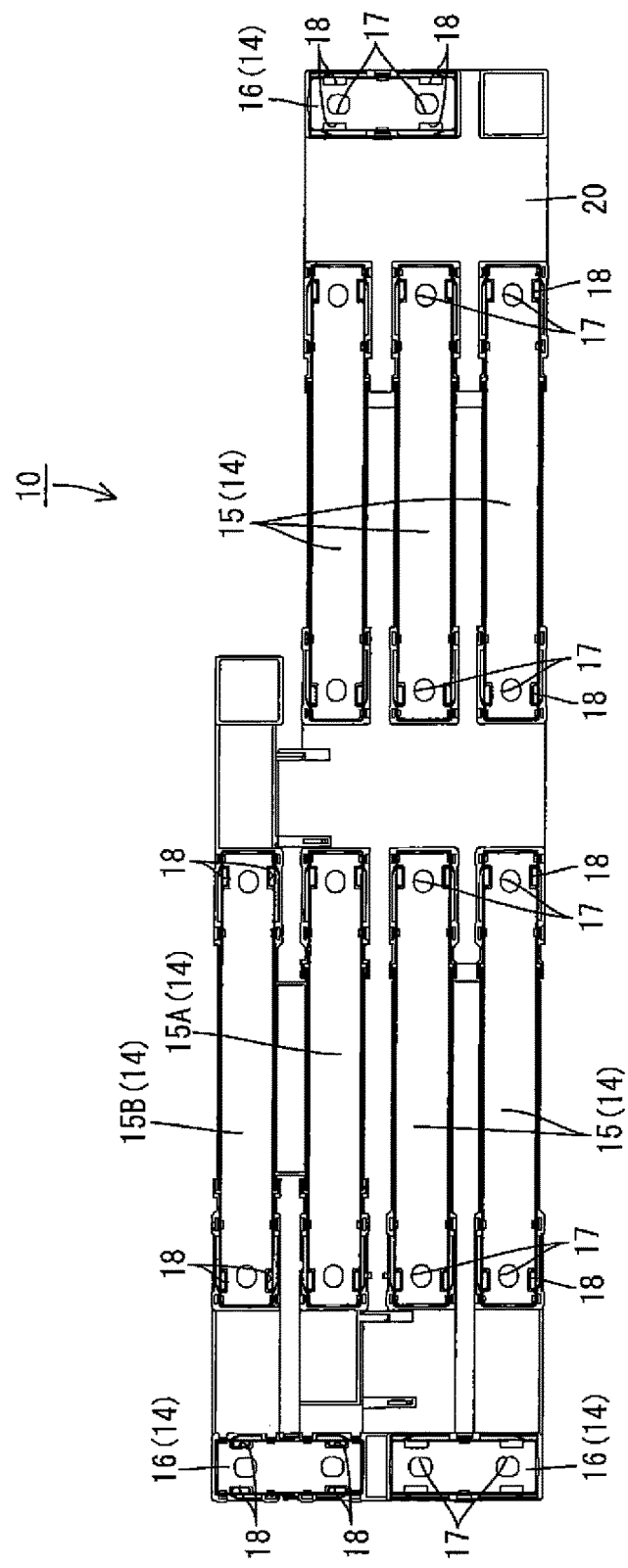
FIG. 1 is a plan view showing a wiring module according to an embodiment.

A wiring module 10 according to the present embodiment serves to connect electrode terminals 12A and 12B of adjacent electric cells 11 to each other with connecting members 14. A battery module (not shown) formed by attaching the wiring module 10 to a plurality of electric cells 11 (electric cell group) is used, for example, as a driving source for a vehicle such as an electric car or a hybrid car. In the following explanations, the vertical direction is based on FIG. 8, and for the front-rear direction, it is assumed that the lower side of FIG. 1 is the front side and the upper side is the rear side.

Figure 7:
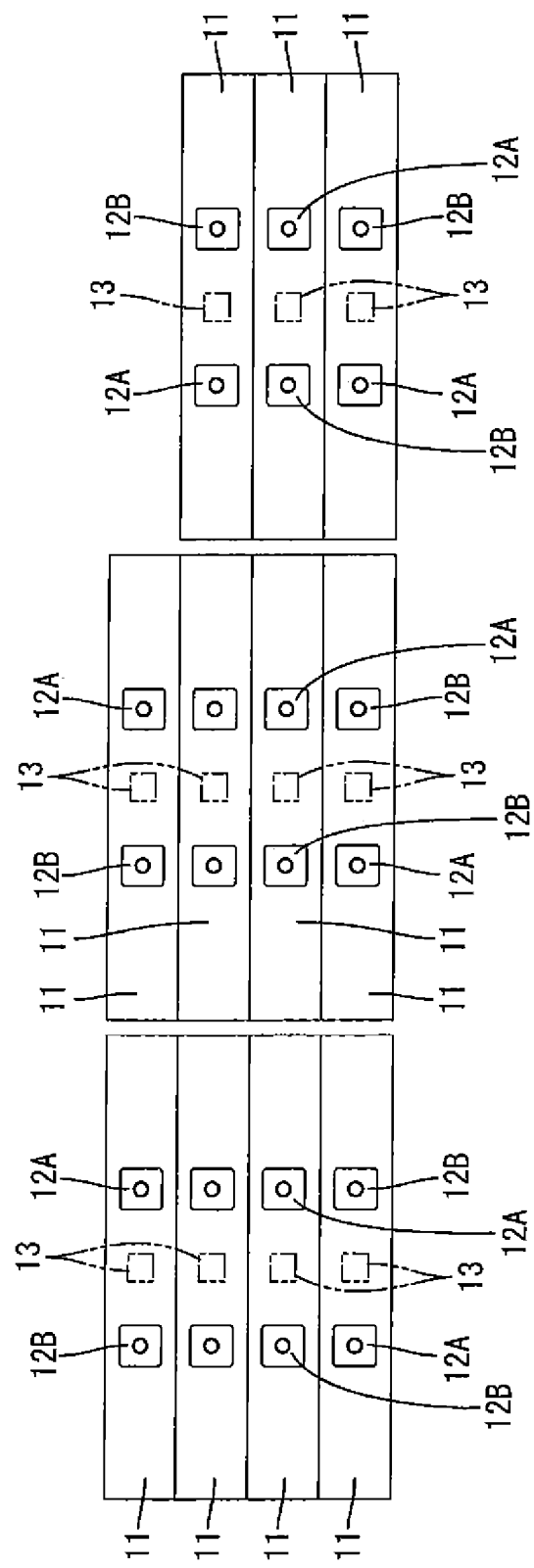
FIG. 7 is a plan view showing an electric cell group in which electric cells are arranged.

As shown in FIG. 7, in an electric cell 11, a pair of electrode terminals 12A and 12B protrude perpendicularly from the top face of a flat, rectangular solid-shaped main portion in which a power generating element (not shown) is accommodated.

Additionally, between the pair of electrode terminals 12A and 12B, a projecting portion 13 for positioning a coupling unit 21, which will be described below, may protrude from the top face of the main portion. Further, a voltage detecting terminal may be provided on the top face of the projecting portion 13 to enable detection of the voltage of the electric cell 11.

Each of the electrode terminals 12A and 12B is a square cylindrical nut (square nut), and a screw hole is formed through its center. The shaft portions of bolts are threadably engaged with the electrode terminals 12A and 12B, thus fixing the connecting member 14.

Each of the electric cells 11 is oriented such that the polarities of the electrode terminals 12A and 12B that are adjacent to each other in the front-rear direction and the direction from left to right are opposite to each other. The electric cell group including a plurality of electric cells 11 that are arranged is fixed by a retaining plate (not shown).

(Wiring Module 10)

As shown in FIG. 1, the wiring module 10 includes a plurality of (in the present embodiment, 10) connecting members 14 that connect the electrode terminals 12A and 12B of adjacent electric cells 11 to each other, and a resin protector 20 made of synthetic resin for holding the plurality of connecting members 14.

(Connecting Member 14)

Figure 4:
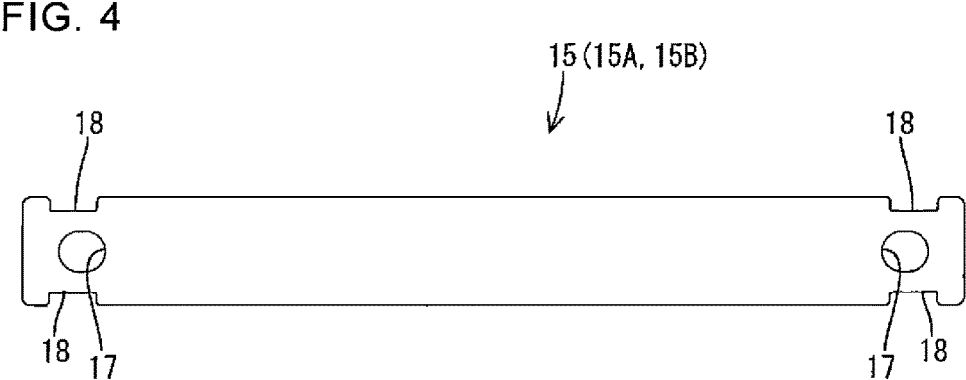
FIG. 4 is a plan view showing a connecting member.
Figure 5:
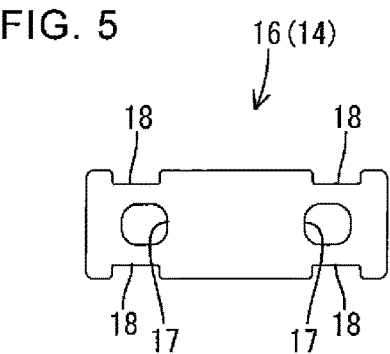
FIG. 5 is a plan view showing a connecting member.

A connecting member 14 is made of metal, such as for example, a metal plate of copper, a copper alloy, stainless steel (SuS), aluminum, or the like, and includes a first connecting member 15 that has a length corresponding to the dimension between the electrode terminals 12A and 12B that are adjacent in the direction from left to right, and a second connecting member 16 that is shorter than the first connecting member 15 in the connection direction and has a length corresponding to the dimension between the electrode terminals 12A and 12B that are adjacent in the front-rear direction (FIGS. 4 and 5).

Each of the connecting members 14 has a pair of through holes 17 formed therethrough in which the shaft portions of the bolts are inserted (the through holes 17 being in communication with the screw holes of the electrode terminals 12A and 12B).

The through holes 17 have an oval shape that is elongated in the connection direction of the connecting member 14.

At opposite side edges of the connecting member 14 in the connection direction, engaging recesses 18 having a shape resulting from cutting the side edges in a rectangular shape (step shape) are formed.

Note that a voltage detection terminal (not shown) may be placed on top of each connecting member 14. Such a voltage detection terminal is connected to the terminal portion of a voltage detection wire, and the voltage detection wire is connected to an external battery ECU (not shown). The battery ECU includes a microcomputer, elements and the like mounted thereon, and has a well-known configuration including the function for performing, for example, detection of the voltage, current, and temperature of the electric cells 11, and charge and discharge control of each of the electric cells 11.

(Resin Protector 20)

Figure 6:
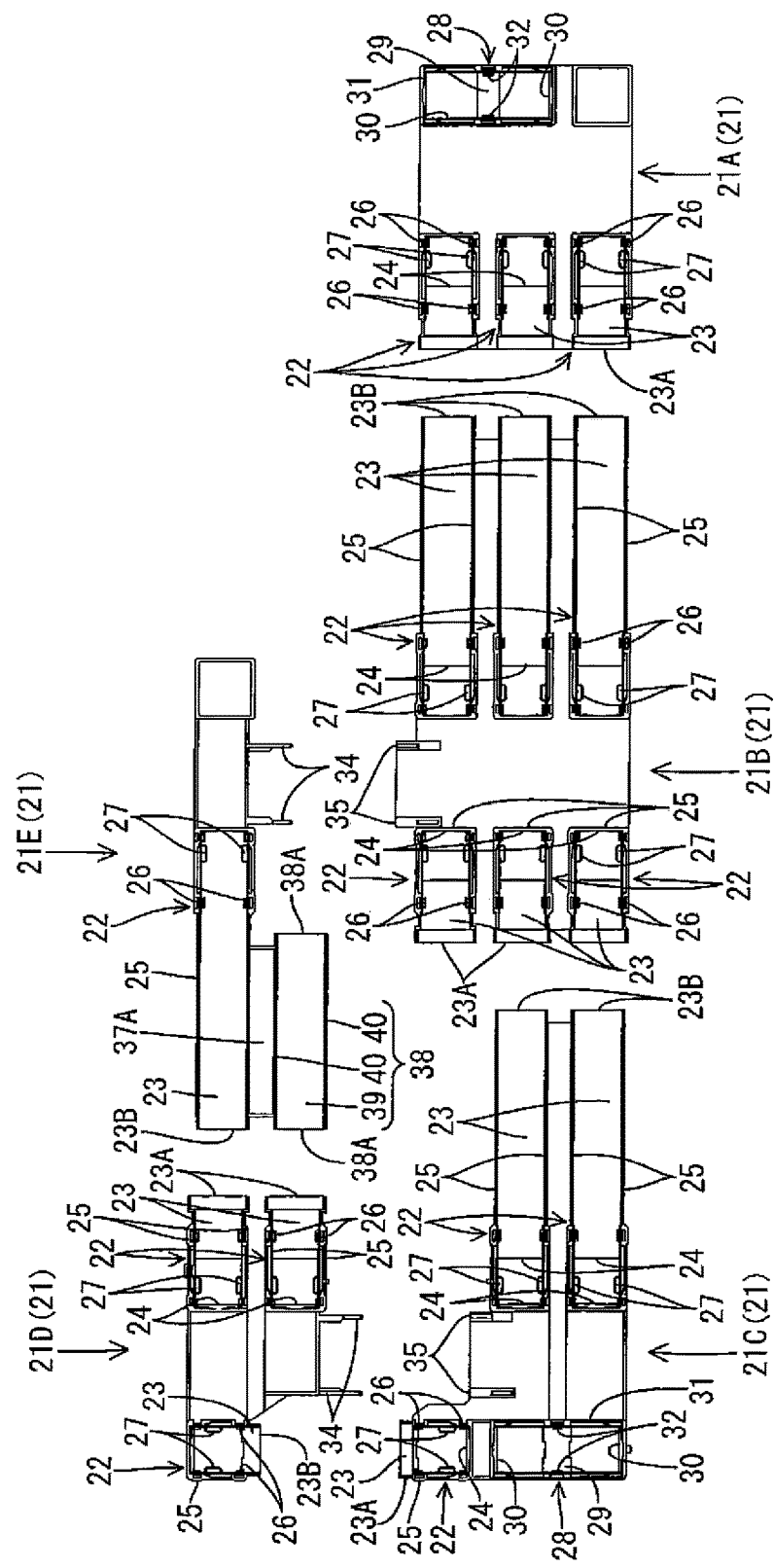
FIG. 6 is a plan view showing a plurality of coupling units that constitute a resin protector.

As shown in FIG. 6, the resin protector 20 includes a plurality of coupling units 21 (the individual coupling units are denoted as 21A to 21E in the drawing), and the adjacent coupling units 21 are coupled to each other via the connecting members 14.

The coupling units 21 include holding portions 22 that hold the connecting members 14.

Each of the holding portions 22 holds one side of the corresponding connecting member 14. Additionally, the coupling units 21A and 21C disposed at the left end and the right end on the front row each include an accommodating portion 28 in which the corresponding connecting members 14 are entirely accommodated.

The holding portions 22 each include a bottom plate 23 on which one end of a connecting member 14 is placed, and a partitioning wall 25 that surrounds one end of the connecting member 14.

The bottom plate 23 and the partitioning wall 25 are coupled to the corresponding bottom plate 23 and partitioning wall 25 of the adjacent coupling unit 21, and thereby, one connecting member is placed on the top faces of the coupled bottom plates 23. The coupled ends of one of the coupled bottom plates 23 and one of the coupled partitioning walls 25 are constituted by slightly expanded fitting portions 23A, which are fitted to fitted portions 23B constituting the corresponding ends of the complementary bottom plate 23 and the complementary partitioning wall 25. The length of the fitting portions 23A in the coupling direction is set to be greater than or equal to a maximum value of a clearance CL1, which allows slidable movement between the coupling units 21 as described below. Thereby, even if the adjacent coupling units 21 are spaced away from each other as a result of slidable movement, the entire bottom face of the connecting member 14 is covered by the bottom plate 23, and the insulation on the bottom face side of the connecting member 14 is maintained.

The bottom plate 23 is not formed at portions at which ends of the connecting member 14 are disposed and these portions constitute rectangular opening portions 24 that allow entry of the cylindrical electrode terminals 12A and 12B.

Each partitioning wall 25 has a height that is set to prevent a tool or the like from coming into contact with the connecting member 14, the bolt or the like and causing short circuit. The partitioning wall 25 is made up of a pair of opposing walls that oppose each other in the front-rear direction and a side wall that links the pair of opposing walls, and is open at one side that opposes this side wall.

Each of the opposing walls is provided with a plurality of holding piece 26 for holding the connecting members 14 within the holding portion 22 (on the bottom plate 23 side thereof).

Each of the holding pieces 26 is formed on the inside of a substantially U-shaped notch formed on the partitioning wall 25. Each holding piece 26 is shaped such that its protruding dimension increases toward the bottom plate 23 in a slope shape (claw shape). Due to the tip side of the claw of the holding piece 26 being located above an edge of the connecting member 14, the connecting member 14 can be held between the lower end of the holding piece 26 and the bottom plate 23.

The locking force exerted on the connecting member 14 by the holding piece 26 is set such that the slidable movement of the connecting member 14 in the connection direction is permitted, that the connecting member 14 is slidable against the pressing force exerted on the connecting member 14 by the holding piece 26, or that the connecting member 14 is slidable by a little clearance formed between the holding piece 26 and the connecting member 14 (without generating pressing force). Note that an auxiliary wall that covers the notched portion is formed integrally with the partitioning wall 25 on the outside of each of the holding pieces 26.

On the inside of each partitioning wall 25 (opposing walls) are provided engaging projections 27 for locking to the engaging recesses 18 of the connecting member 14 to restrict slidable movement of the connecting member 14 in the connection direction by an amount exceeding a predetermined range (predetermined clearance CL1).

Each engaging projection 27 protrudes in a rectangular shape (step shape) at a position corresponding to the corresponding engaging recess 18 of the connecting member 14. The position of the engaging projection 27 in the vertical direction is the same as the position of the corresponding engaging recess 18 of the connecting member 14.

Figure 2:
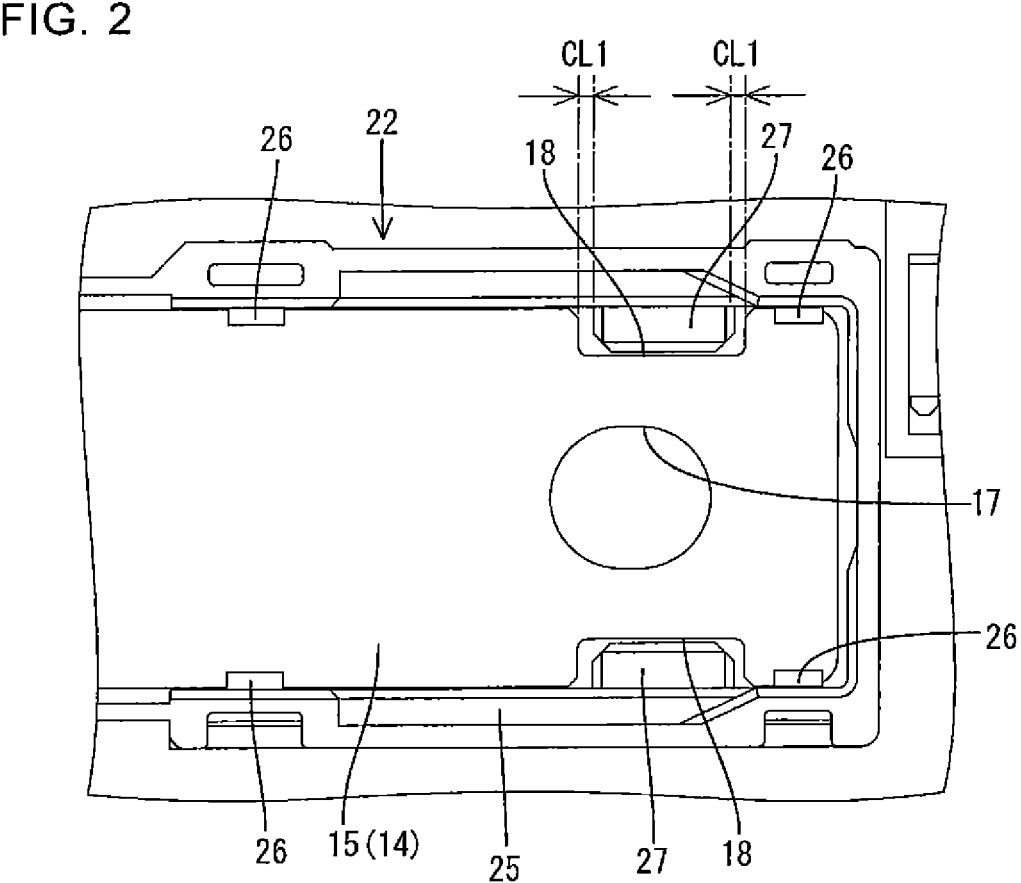
FIG. 2 is an enlarged view showing a state in which a connecting member is held by a holding portion.
Figure 3:
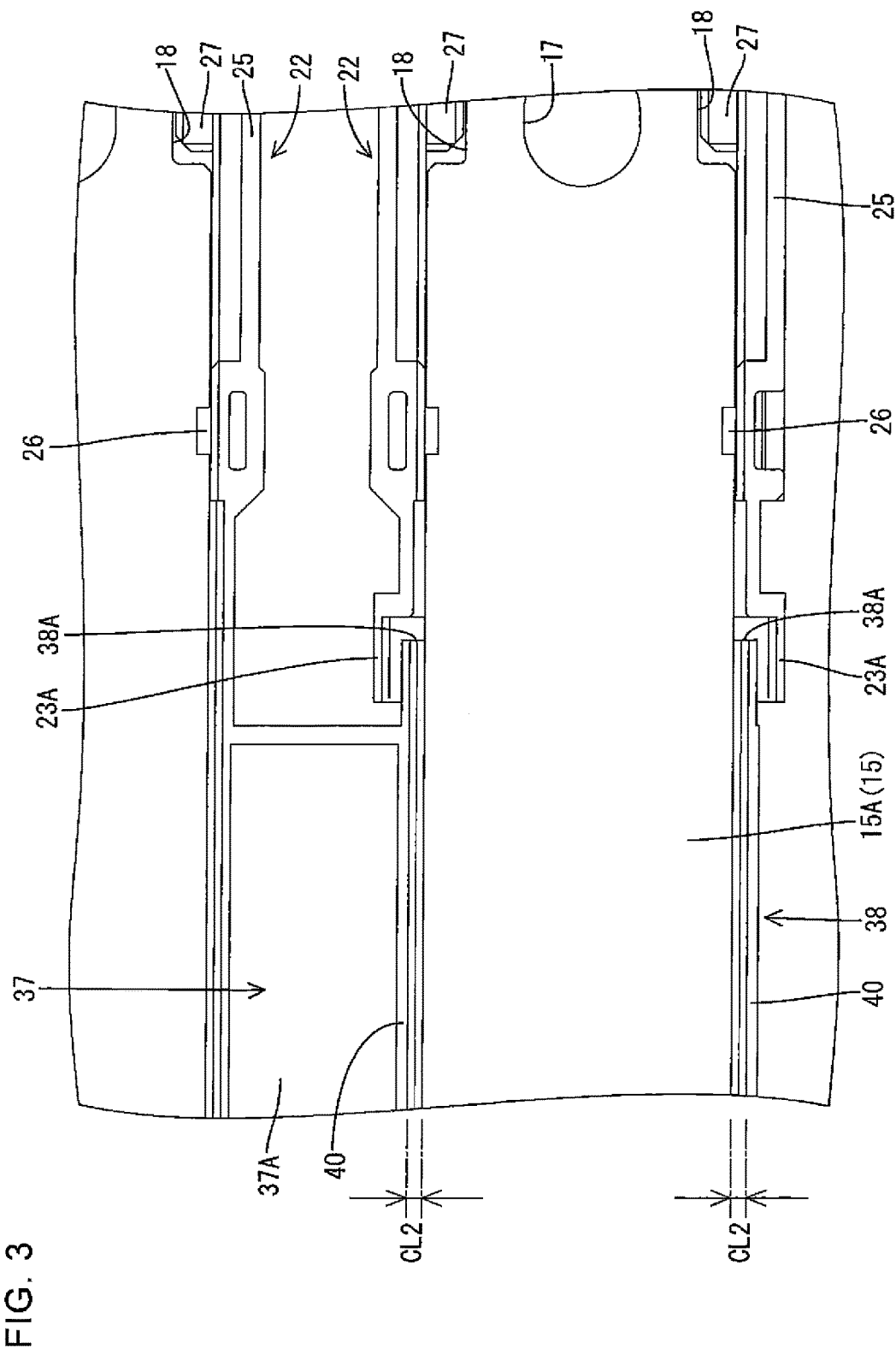
FIG. 3 is an enlarged view showing a state in which a connecting member is held by a receiving portion.

Thus, as a result of the engaging recesses 18 engaging with the engaging projections 27, each of the connecting members 14 becomes slidable relative to the coupling unit 21 in the connection direction of the connecting member 14 within a range corresponding to the predetermined clearance CL1 as shown in FIG. 2.

As shown in FIG. 6, the accommodating portions 28 each include a bottom plate 29 on which a connecting member 14 is placed, and a square cylindrical partitioning wall 31 that surrounds the connecting member 14.

The bottom plate 29 couples base end portions of the partitioning wall 31 to each other.

Rectangular opening portions 30 are located in front of and behind the bottom plate 29. The opening portions 30 are sized to allow entry of the electrode terminals 12A and 12B.

The partitioning wall 31 has a height that is set to prevent a tool or the like from coming into contact with the connecting member 14 or the head of the bolt and causing short circuit.

A pair of holding pieces 32 that hold the connecting member 14 within the accommodating portion 28 are provided at an intermediate portion, with respect to the front-rear direction, of the partitioning wall 31. Due to the claw-shaped tips of the holding pieces 32 being located above the front and rear edges of the bottom plate 29, the connecting member 14 can be locked onto the bottom plate 29.

Each of the holding pieces 32 is formed by a substantially U-shaped notch provided on the partitioning wall 31. On the outside of the holding piece 32, an auxiliary wall that covers the notched portion is formed integrally with the partitioning wall 31.

Figure 8:
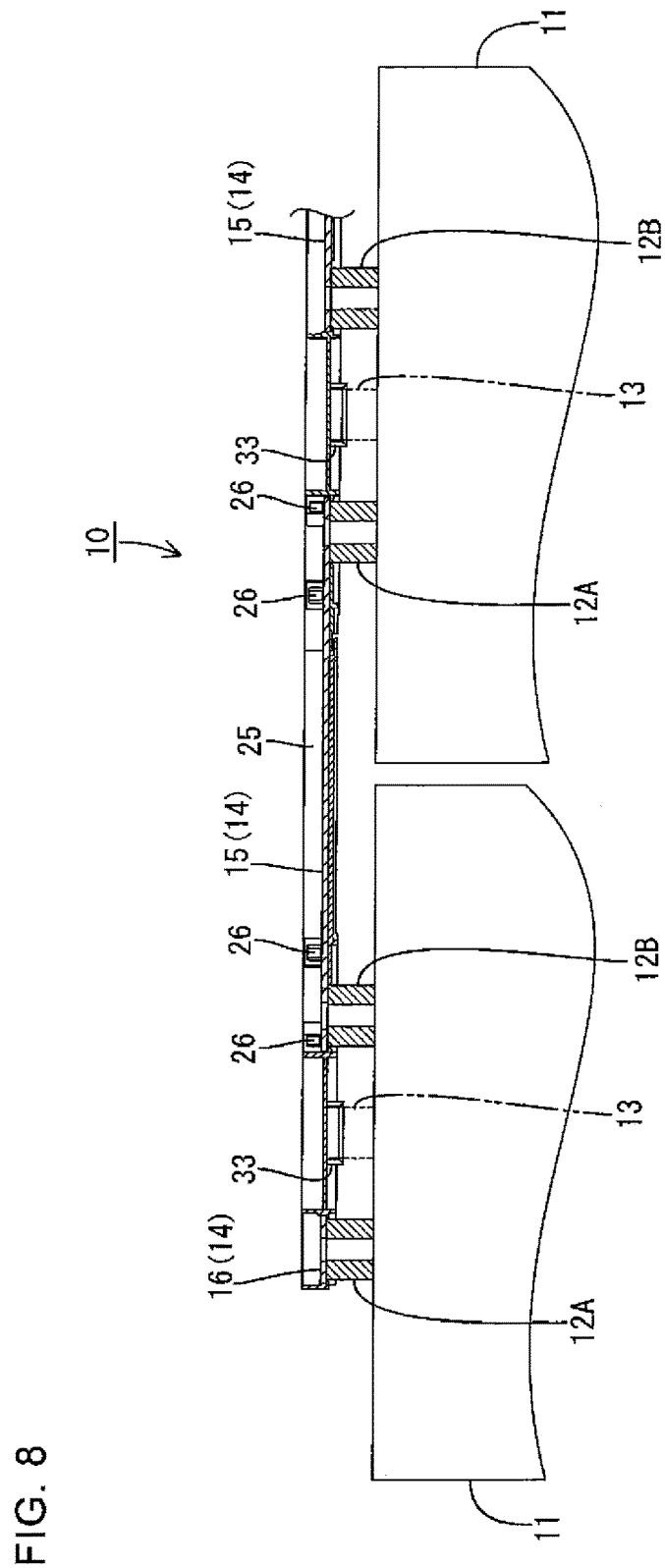
FIG. 8 is a cross-sectional view showing a state in which the wiring module is disposed on a plurality of electric cells.

As shown in FIG. 8, positioning portions 33 having the form of a rectangular pipe-shaped frame are provided protruding downward on the back side of each of the coupling units 21.

At the time of assembling the wiring module 10 to the electric cells 11, each of the coupling units 21 can be positioned relative to the electric cells 11 by fitting the positioning portions 33 to the projecting portions 13 of the electric cells 11. Even if there is a dimensional difference between the positions of the electric cells 11 and the coupling units 21 during this positioning, the coupling units 21 may be slidably moved relative to one another according to the dimensional difference.

As shown in FIG. 6, the coupling units 21D and 21E arranged on the rear side are provided with a pair of fitting portions 34 for fitting into the fitted portions 35 of the coupling units 21B and 21C arranged on the front side.

The pair of the fitting portions 34 are both members protruding in a rod shape, and have a flat shape having a larger thickness in the vertical direction and a smaller thickness in the direction from left to right.

The fitted portions 35 each have a hole having a depth into which the fitting portions 34 fits. In a state in which the fitting portions 34 fit in the fitted portions 35, the fitted portions 35 can be inserted or extracted in the front-rear direction, but their movement in the direction from left to right is restricted.

Of the plurality of coupling units 21, the coupling unit 21E disposed at one end of the coupling includes an extension portion 37 that is extended toward another connecting member 15A (the connecting member 15 that couples the coupling unit 21B and 21D to each other is referred to as "connecting member 15A") that is different from a connecting member 15B (a connecting member 15 that couples the coupling units 21D and 21E to each other is referred to as the connecting member 15B) that couples the coupling unit 21E.

The extension portion 37 is integrally linked to the front of the holding portion 22 of the coupling unit 21E, and includes a receiving portion 38 that receives the other connecting member 14 and a coupling portion 37A that couples the receiving portion 38 and the holding portion 22 to each other.

The receiving portion 38 is interposed between the holding portions 22 of the coupling units 21B and 21D, and serves to receive and hold a portion of the connecting member 15A that is not held by the holding portions 22. The receiving portion 38 includes a bottom plate 39 extending in the direction from left to right (the connection direction of the connecting members 15) and a pair of holding walls 40 standing upright from opposite side edges (the front and rear end edges) of the bottom plate 39 in the extension direction.

The left and right ends of the receiving portion 38 are formed as fitted portions 38A, and are fitted to the fitting portions 23 of the holding portions 22 of the coupling units 21B and 21D. Consequently, even if the adjacent coupling units 21B and 21D located on the left and right sides of the receiving portion 38 are spaced away from the receiving portion 38 as a result of slidable movement, the entire bottom face of the connecting member 14 is covered by the bottom plate 23, and the insulation on the bottom face side of the connecting member 15A is maintained.

The dimension between the pair of holding walls 40 is set to form a predetermined clearance CL2 between the connecting member 14 and each of the holding walls 40 when the connecting member 15A is held inside the holding walls 40.

The predetermined clearance CL2 is set according to the estimated dimensional difference during assembly, and is set to be greater than or equal to a dimension that enables the wiring module 10 to be assembled to the plurality of electric cells 11 even if there is a dimensional difference during assembly.

When the clearance CL2 is too large, the ease of arrangement during attachment of the wiring module 10 is decreased. Accordingly, the clearance CL2 is set to be less than or equal to a dimension that does not compromise workability during attachment of the wiring module 10 to the plurality of electric cells 11.

The holding walls 40 have a height that is set to prevent a tool or the like from coming into contact with the connecting member 15A or the head of the bolt and causing short circuits. Although the holding walls 40 are not provided with configurations corresponding to the holding pieces 26 of the partitioning wall 25, it is also possible to provide the holding walls 40 with the holding pieces 26, and hold the connecting member 14 within the receiving portion 38.

Next, the assembly of the wiring module 10 will be described.

First, the coupling units 21A to 21E are arranged next to each other, and the connecting members 14 are mounted to the holding portions 22. Thereby, the connecting members 14 are held by the holding portions 22, and accommodated in the accommodating portions 28. At this time, the connecting member 15A is held by the holding portions 22 of the coupling units 21B and 21D, and by the receiving portion 38 of the coupling unit 21E disposed therebetween.

Thereby, a wiring module 10 is formed. Note that it is also possible to provide a wiring module 10 to which a voltage detection terminal is further mounted.

The present embodiment achieves the following effects.

(1) According to the present embodiment, the adjacent coupling units 21A to 21E are coupled via the connecting members 14, which are slidable in the connection direction of the connecting members 14. Accordingly, it is possible to mount the wiring module 10 to the plurality of electric cells 11 by this slidable movement, while changing the relative positional relationship between the coupling units 21A to 21E in the connection direction of the connecting members 14 in accordance with any errors in dimensional accuracy. Accordingly, it is possible to prevent problems during mounting of the wiring module 10.

Here, when the connection directions of the first connecting members 15 and the second connecting members 16 are in a substantially orthogonal (intersecting) relationship, the relative positional relationship between adjacent coupling units 21 that are not coupled via the connecting member 14 of the plurality of coupling unit 21 tends to change, so that there is the possibility that the ease of arrangement of the plurality of coupling units 21 may be decreased and the workability during mounting of the wiring module 10 may be reduced.

On the other hand, according to the present embodiment, the coupling unit 21E (of the plurality of coupling unit, one coupling unit of adjacent coupling units that are not coupled to each other via the connecting member) located on an end of the coupling includes an extension portion 37 that is extended toward another connecting member 15A that is different from the connecting member 15B that couples the coupling unit 21E, and the extension portion 37 holds the other connecting member 15A. Accordingly, the ease of arrangement during attachment of the wiring module 10 is increased, making it possible to improve workability during attachment of the wiring module 10.

(2) The extension portion 37 includes a pair of holding walls 40 that are disposed along the side edges of the other connecting member 15A and that hold the other connecting member 15A thereinside, and the dimension between the pair of holding walls 40 is set to form a predetermined clearance CL2 between the other connecting member 15A and the pair of holding walls 40 when the other connecting member 15A is held inside the pair of holding walls 40.

This makes it possible to cause positional displacement between the other connecting member 15A and the extension portion 37 within a range corresponding to the predetermined clearance CL2, and it is thus possible to prevent a failure during mounting of the wiring module 10 according to the dimensional difference.

(3) The extension portion 37 includes a bottom plate 39 on which the connecting member 14 is placed, and a pair of holding walls 40 standing upright from side edges of the bottom plate 39.

This can simplify the configuration of the extension portion 37.

(4) The extension portion 37 is provided to the coupling unit 21E disposed at an end of the coupling, of the plurality of coupling unit 21 that are coupled via the plurality of connecting member 14.

This makes it possible to improve the ease of arrangement during attachment of the wiring module 10 for the coupling unit 21E that is disposed at an end of the coupling that tends to cause a decrease in the ease of arrangement of the plurality of coupling unit 21.

(5) One coupling unit 21 of the adjacent coupling units 21 is provided with the fitted portions 35 and the other coupling unit 21 that is different from the one coupling unit 21 is provided with the fitting portions 34 for fitting in the fitted portions 35.

This makes it possible to improve the ease of arrangement in the wiring module, while permitting relative movement between the coupling units according to the clearance between the holding walls.

(6) The coupling units 21 are provided with the positioning portions 33 for carrying out positioning relative to the electric cells 11.

This makes it possible to position the coupling units 21 by the positioning portions 33. Thus, during this positioning, it is possible to move the coupling units 21 relative to each other according to the dimensional difference between the electric cells 11 and the coupling units 21.

(7) The wiring module 10 is fixed to the electric cells 11 by inserting the electrode terminals 12A and 12B having a rod shape or the shaft portions of the bolts into the through holes 17 of the connecting members 14, and the through holes 17 have an oval shape that is elongated in the connection direction of the connecting members 14.

Since the through holes 17 of the connecting members 14 have an oval shape that is elongated in the connection direction of the connecting members 14, it is possible to insert the electrode terminals 12A and 12B having a rod shape or the shaft portions of the bolts into the through holes 17 of the connecting members 14 even if there is a dimensional difference between the electrode terminals 12A and 12B in the connection direction of the connecting member 14.

Other Exemplary Embodiments

The claimed subject matter is not limited to the exemplary embodiment described by the above statements and drawings, and, for example, the following exemplary embodiments also fall within the technical scope of the claimed subject matter.

(1) Although the above exemplary embodiment describes a configuration that includes the receiving portion 38 including the bottom plate 23 and the pair of holding walls 40, the present invention is not limited thereto. For example, it is possible to adopt a configuration that includes a pair of holding walls 40 without a bottom plate 23. In this case, for the insulation on the bottom face side of the connecting member 14, the connecting member 14 may be extended to such a length with which no clearance is formed between the bottom plates 23 of the holding portions 22 on opposite sides of other coupling units 21 (21A to 21E).

(2) Although the extension portion 37 is provided on the coupling unit 21E disposed at an end of the coupling in the above embodiment, the present invention is not limited thereto. For example, when another coupling unit is further coupled to the coupling unit 21E, the extension portion 37 may be provided on a coupling unit other than the coupling unit provided at an end.

(3) Although the above exemplary embodiment describes a configuration in which the terminals of the electric cells 11 have a nut shape and fastening is achieved by using bolts as separate members, the present invention is not limited thereto. It is also possible to adopt a configuration in which the electrode terminals 12A and 12B have a rod-shaped shaft portion having a screw groove on the outer circumferential face thereof and the connecting member 14 is fixed to the terminal portions by fastening nuts as separate members. In this case, the shaft portions of the electrode terminals 12A and 12B will be inserted into the through holes 17 of the connecting members 14.

(4) Although the above exemplary embodiment describes a case where a plurality of electric cells 11 are connected in series, the present invention is not limited thereto. It is also possible to apply the invention to a case where a plurality of electric cells 11 are connected in parallel.

(5) The number of the electric cells 11 that constitute the battery modules is not limited to the number described in the above exemplary embodiment. Furthermore, the shape of the wiring module 10 can be freely set according to the number of the electric cells 11.

The invention claimed is:

1. A wiring module comprising:
a plurality of connecting members for electrically connecting electrode terminals of adjacent electric cells to each other in a battery module in which a plurality of electric cells including positive and negative electrode terminals are arranged, the plurality of connecting members including:
first connecting members connecting the electrode terminals of the adjacent electric cells to each other, and
second connecting members connecting the electrode terminals of the adjacent electric cells to each other in a direction intersecting a connection direction of the first connecting members; and
a resin protector holding the plurality of connecting members, the resin protector including a plurality of coupling units coupled via the connecting members, the plurality of coupling units insulating a side of at least one connecting member from a surface of at least one electric cell, wherein:
adjacent coupling units of the plurality of coupling units are slidably coupled via the connecting members in the connection direction of the first connecting members; and
a first coupling unit, of adjacent coupling units that are not coupled to each other via the corresponding connecting member, includes an extension portion that is extended toward a center portion of another connecting member different from the connecting member that couples the first coupling unit, the extension portion holding the center portion of the another connecting member by sliding underneath the center portion of the another connecting member.

2. The wiring module according to claim 1, wherein
the extension portion includes a pair of holding walls that are disposed along side edges of the other connecting member and that hold the other connecting member thereinside; and
a dimension between the pair of holding walls is set to form a predetermined clearance between the other connecting member and the pair of holding walls when the other connecting member is held inside the pair of holding walls.

3. The wiring module according to claim 2, wherein the extension portion includes a bottom plate on which the connecting member is placed, and the pair of holding walls standing upright from side edges of the bottom plate.

4. The wiring module according to claim 1, wherein the extension portion is provided to one of the plurality of coupling units coupled via the plurality of connecting members that is disposed at an end of the coupling.

5. The wiring module according to claim 1, wherein a second coupling unit of the adjacent coupling units is provided with a fitted portion, and the first coupling unit that is different from the second coupling unit is provided with a fitting portion for fitting in the fitted portion.

6. The wiring module according to claim 1, wherein the coupling units are provided with positioning portions for positioning relative to the electric cells.

7. The wiring module according to claim 1, wherein
the wiring module is fixed to the electric cells by inserting electrode terminals having a rod shape or by inserting shaft portions of bolts into through holes of the connecting members, and
the through holes have an oval shape that is elongated in the connection direction of the connecting members.

\* \* \* \* \*